United States Patent [19]

Egawa et al.

[11] Patent Number: 5,485,332
[45] Date of Patent: Jan. 16, 1996

[54] FLOATING MAGNETIC HEAD HAVING A CHAMFERED MAGNETIC HEAD CORE

[75] Inventors: Motoji Egawa; Tetsuji Fujita, both of Shizuoka, Japan

[73] Assignee: Minebea Co., Ltd., Nagano, Japan

[21] Appl. No.: 109,903

[22] Filed: Aug. 23, 1993

[30] Foreign Application Priority Data

Nov. 30, 1992 [JP] Japan .................................. 4-343425
Dec. 8, 1992 [JP] Japan .................................. 4-351663

[51] Int. Cl.⁶ ............................................ G11B 5/60
[52] U.S. Cl. ........................................ 360/103; 360/125
[58] Field of Search ................................. 360/103, 104, 360/125, 126

[56] References Cited

U.S. PATENT DOCUMENTS

| | | | |
|---|---|---|---|
| 3,229,268 | 1/1966 | Solyst | 360/125 |
| 4,894,742 | 1/1990 | Saito et al. | 360/126 |
| 4,918,555 | 4/1990 | Yoshizawa et al. | 360/126 |
| 5,079,664 | 1/1992 | Miyaguchi | 360/126 |
| 5,091,810 | 2/1992 | Kakizaki et al. | 360/103 |
| 5,305,516 | 4/1994 | Imazeki et al. | 360/126 |
| 5,349,487 | 9/1994 | Egawa et al. | 360/103 |
| 5,359,481 | 10/1994 | Egawa | 360/103 |

FOREIGN PATENT DOCUMENTS

| | | |
|---|---|---|
| 62-75927 | 4/1987 | Japan . |
| 1-276421 | 11/1989 | Japan . |
| 3-19119 | 1/1991 | Japan . |
| 3-49019 | 3/1991 | Japan . |
| 3-125320 | 5/1991 | Japan . |
| 3-272004 | 12/1991 | Japan . |

*Primary Examiner*—A. J. Heinz
*Assistant Examiner*—Jefferson Evans
*Attorney, Agent, or Firm*—Oliff & Berridge

[57] ABSTRACT

A floating magnetic head includes a nearly rectangular non-magnetic slider having a floating surface for generating a floating force against a magnetic recording medium, and a magnetic head core including trailing and leading portions made of a magnetic thin film material laminated into a thickness equivalent to a track width and sandwiched by non-magnetic substrates. The magnetic head core is bonded via glass to a side portion of the slider so that a magnetic gap is located on the surface which slides against the magnetic recording medium and the magnetic head core is made shorter than the length of the side of the slider. A chamfered portion is formed in at least one side of the magnetic head core.

5 Claims, 4 Drawing Sheets

FLOATING MAGNETIC HEAD HAVING A CHAMFERED MAGNETIC HEAD CORE

BACKGROUND OF THE INVENTION

1. Field of the Invention

The present invention relates to an improvement of a floating magnetic head used in a rigid magnetic disk unit used for a computer and the like.

2. Description of the Related Art

It is a general tendency that a track width of a floating magnetic head used for a rigid magnetic disk unit is getting narrower in order to achieve high density recording, and therefore, a laminated core having a narrow track width by forming magnetic thin films composed of Fe-Al-Si alloy and amorphous magnetic material on a non-magnetic slider have been proposed. Examples of such floating magnetic head are shown in FIG. 3 (Japanese Patent Laid-Open No. 3-19119), FIG. 4 (Japanese Patent Laid-Open No. 3-272004), FIG. 5 (Japanese Patent Laid-Open No. 3-49019), and FIG. 6 (Japanese Patent Laid-Open No. 3-125320).

A floating magnetic head 1 shown in FIG. 3 has a nearly rectangular slider 2 made of a non-magnetic material. Magnetic films 5 made of Fe-Al-Si alloy which is a part of magnetic head cores 4 are sandwiched in rails (floating surface) 3 provided on the slider 2. C-shaped magnetic head cores 7 having magnetic films 6 made of Fe-Al-Si alloy which form the main core portion 4 together with the magnetic films 5 are bonded to the slider 2. The magnetic head cores 7 are structured so that the head core side magnetic films 6 are sandwiched by non-magnetic substrates 8 and that the head core side magnetic films 6 are connected to the magnetic films 5 magnetically through a gap.

The reference numeral 9 in the figure indicates gaps.

In a floating magnetic head 1 shown in FIG. 4, a magnetic film 5 is formed in the middle part of a slider 2.

In a floating magnetic head 1 shown in FIG. 5, laminated magnetic films 5 are sandwiched in one of rails 3 of a slider 2 and a magnetic head core 7 is bonded to one end of the slider 2. The magnetic head core 7 comprises laminated magnetic films 6. The head core side magnetic films 6 are connected magnetically to the magnetic films 5 to form a gap 9.

In a floating magnetic head 1 shown in FIG. 6, a longitudinal main core portion 4 in which a magnetic film 6 is sandwiched by substrates 8 made of a non-magnetic material is inserted to and bonded with a slit 10 formed on a slider 2.

In the floating magnetic heads 1 shown in FIGS. 3, 4, 5 and 6, however, there has been a problem that they are susceptible to an external magnetic field, thereby reducing their S/N ratio, because the main core portion 4 which is obtained by forming and laminating magnetic films (the magnetic films 5 and 6) is formed across the whole length of the rail (floating surface) 3. Further, there has been another problem that because abrasion resistance of the magnetic films (the slider side magnetic film 5 and head core side magnetic films 6) and of the non-magnetic slider 2 are different, partial abrasion is generated between the magnetic films and the slider 2, thereby damaging their reliability due to a deterioration of CSS resistance caused by steps produced between them and dust adhered thereon. Materials which have better CSS resistance could be chosen for the slider 2, but they were sometimes inferior in terms of the compatibility with the magnetic films.

In the floating magnetic head 1 shown respectively in FIGS. 3, 4 and 5, because the bonding strength is maintained only by a fillet glass, they tend to lack the bonding strength.

In the floating magnetic head 1 shown in FIGS. 3, 4 and 5, the laminated core (the main core portion 4) cannot but be thinned down so much if a track is to be narrowed down, causing a problem that magnetic reluctance on the rear gap 11 is increased compared to the front gap 9, and thereby the write and readback efficiency is degraded.

Still more, the floating magnetic head 1 shown respectively in FIGS. 3, 4, 5 and 6 had a difficulty in aligning tracks at the gap 9, thereby an effective track width would be different from its desired size.

Accordingly, it is an object of the invention to overcome the aforementioned problems by providing a floating magnetic head which allows to improve the CSS characteristic, to assure a fully large bonding strength and to improve the write and readback efficiency by assuring an adequate magnetic reluctance.

SUMMARY OF THE INVENTION

A floating magnetic head of the present invention comprises a nearly rectangular non-magnetic slider on one surface of which a floating surface for generating a floating force against a magnetic recording medium is created, and a magnetic head core comprising a trailing portion (hereinafter referred to as an I-shaped core) and a leading portion (hereinafter referred to as a C-shaped core) which are thin films made of a magnetic material laminated into a thickness equivalent to a track width and are sandwiched non-magnetic substrates. The magnetic head core is bonded to a side portion of the slider via glass so that a magnetic gap is created on the surface which slides against the magnetic recording medium. The magnetic head core is made shorter than the whole length of the side of slider.

Further, a notch may be created on the side portion of the slider to bond the floating magnetic head thereon.

Still more, a notch or a channel is created on the substrates of at least one core on the opposite side from the slider side at the bonding section of the I-shaped core and C-shaped core to fill glass to reinforce the bonding strength of the both cores.

Furthermore, in order to achieve the aforementioned goals, according to a second embodiment of the invention, a floating magnetic head comprises a nearly rectangular non-magnetic slider on one surface of which a floating surface for generating a floating force against a magnetic recording medium is created, and a magnetic head core having a laminated core which is obtained by laminating magnetic films and is provided between non-magnetic substrates, having a track portion for creating a gap for recording and reproducing on the front end thereof, and being shorter than the side portion of the slider. The magnetic head core is bonded to the side portion of the slider by positioning the track portion on the side of the floating surface of the slider. The side portion on the opposite side from the bonding section of the magnetic head core and the slider or both side portions are chamfered to create inclined faces so that a width of surface of the laminated core of the magnetic head core becomes equal to a desired track width to thicken the rear gap side as compare to the gap side of the laminated core.

According to the invention constructed as described above, because the magnetic head core is short as compare to the length of the side portion of the slider, an influence of external disturbing magnetic field may be minimized, a fully large bonding strength may be maintained and CSS resistance may be improved.

Further, the invention constructed as described above allows reduction in the track width and improvement in the write and readback efficiency because the thickness of the rear gap side of the laminated core is set to be thicker than that of the gap portion side of the laminated core obtained by laminating magnetic films and thereby magnetic reluctance on the gap side becomes greater than that on the rear gap side.

Still more, because inclined faces are created by grinding both sides of the magnetic head core so that the size of the laminated core becomes equal to a desired track width in a process of creating a gap of the magnetic head core, the problem of dislocation of the tracks may be solved even if dislocation is caused in the process.

The above and other related objects and features of the invention will be apparent from a reading of the following description of the disclosure found in the accompanying drawings and the novelty thereof pointed out in the appended claims.

DETAILED DESCRIPTION OF PREFERRED EMBODIMENTS

Figure 1:
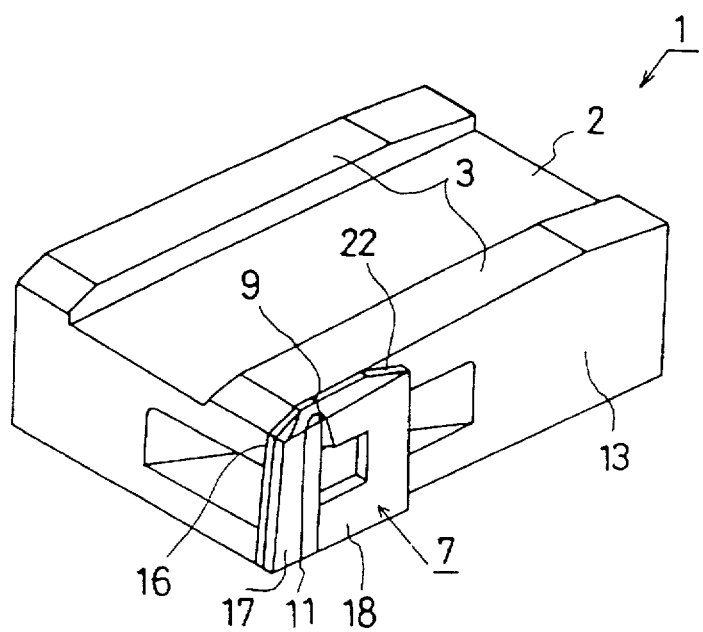
FIG. 1 is a perspective view illustrating a floating magnetic head of an embodiment of the invention.
Figure 2:
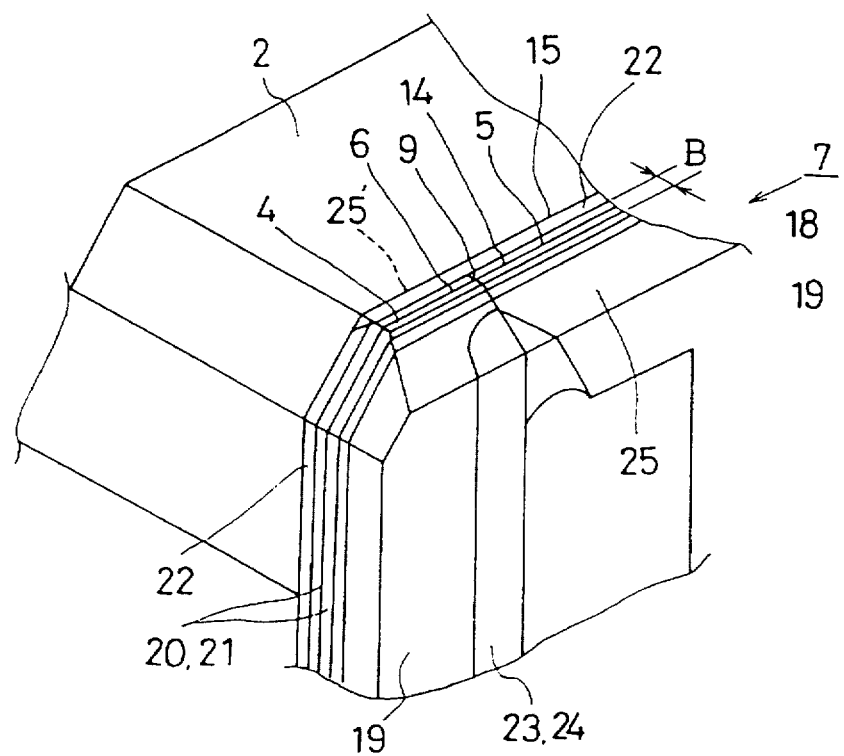
FIG. 2 is a partially enlarged view illustrating the floating magnetic head in FIG. 1.
Figure 3:
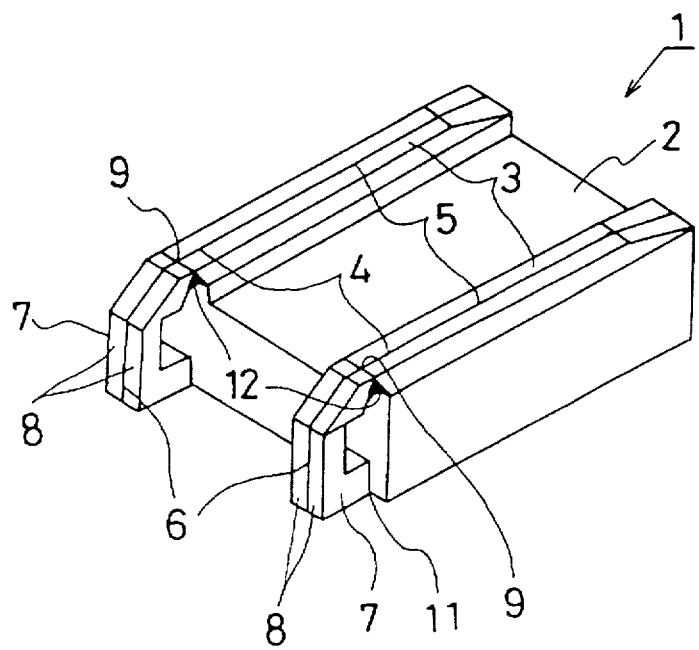
FIG. 3 is a perspective view illustrating one example of a prior art floating magnetic head.
Figure 4:
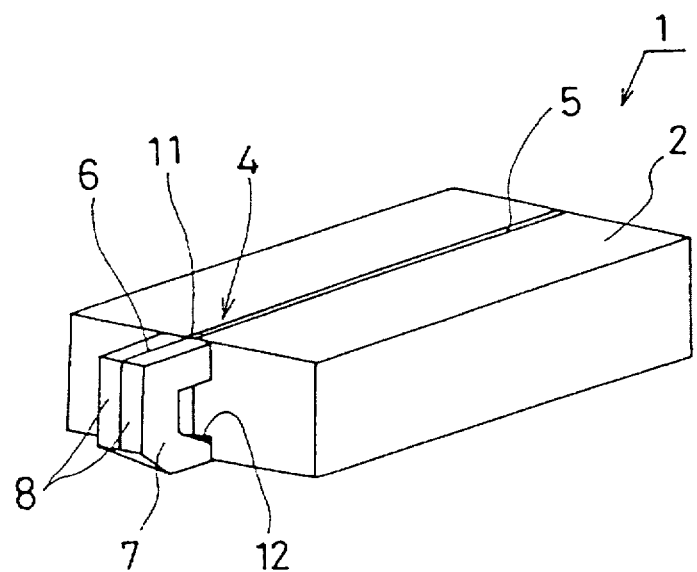
FIG. 4 is a perspective view illustrating another example of a prior art floating magnetic head.
Figure 5:
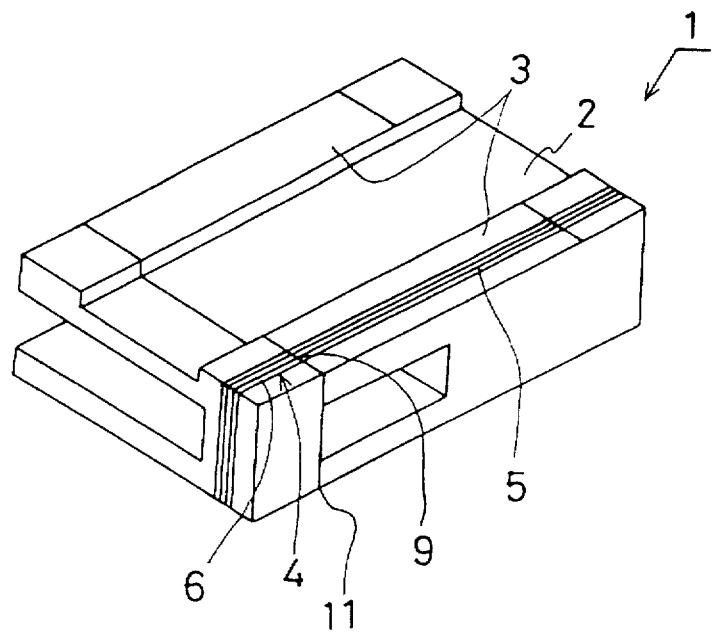
FIG. 5 is a perspective view illustrating still another example of a prior art floating magnetic head.
Figure 6:
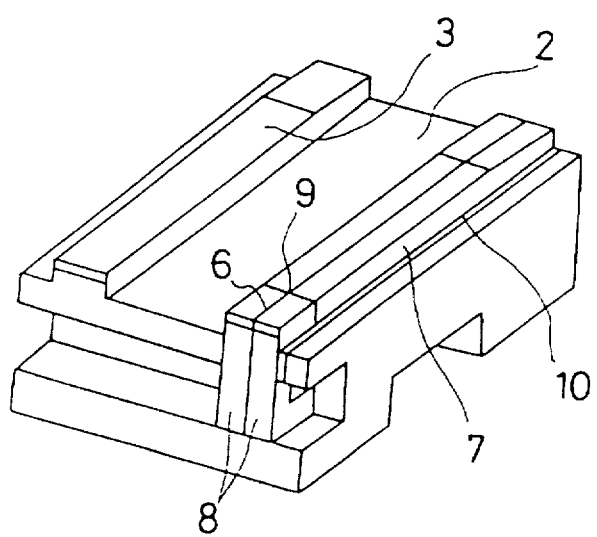
FIG. 6 is a perspective view illustrating a prior art floating magnetic head in which a magnetic head core is inserted in a slit of a slider.
Figure 7:
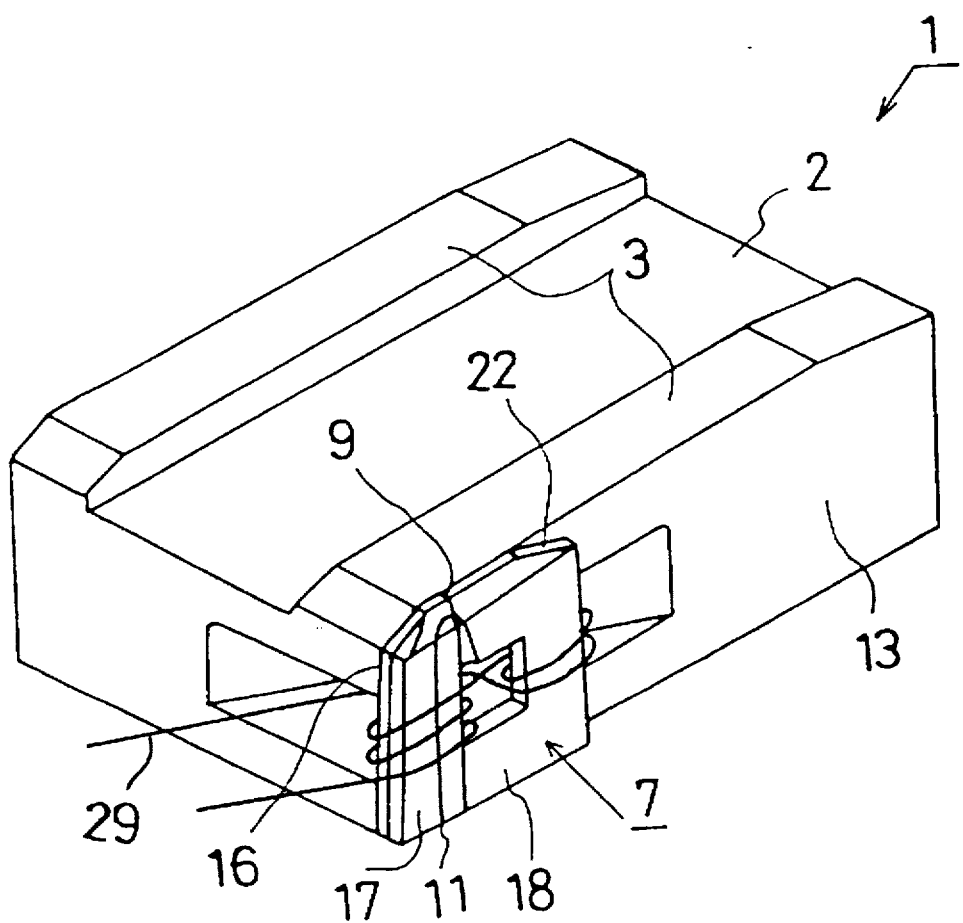
FIG. 7 is a perspective view illustrating a floating magnetic head according to an embodiment of the invention.

Referring now to FIG. 1 through 2, preferred embodiments of the present invention will be explained. At first, a floating magnetic head 1 according to a first embodiment of the invention will be explained referring to FIGS. 1 and 2.

The floating magnetic head 1 has a nearly rectangular slider 2 made of a non-magnetic material. The upper surface of the slider 2 is adapted to face to a magnetic recording medium and rails (floating surfaces) 3 for generating a floating force are provided on the surface.

A magnetic head core 7 having a track section 14 in which a gap 9 for write and readback is created and which is shorter than the slider 2 is bonded on a side portion 13 on the side of one rail 3 of the slider 2 projecting therefrom using a low melting point glass 15 in a state that the track section 14 is disposed on the rail 3 side.

In this case, the bonding by means of the low melting point glass 15 is carried out by forming the low melting point glass 15 on a bonding surface of the slider 2 (hereinafter referred to as a slider bonding surface) using a sputtering method. By the way, it is possible to form the low melting point glass 15 on the bonding surface of the slider 2 by printing. Although the low melting point glass 15 is used to bond the main core portion (laminated core) 4 on the slider 2, another bonding material such as a low melting point metal may be used.

The magnetic head core 7 comprises an I-shaped core 17 and C-shaped core 18 which are bonded to each other. The I-shaped core 17 and C-shaped core 18 are fabricated respectively by forming a magnetic film 20 of Fe-Al-Si alloy on a non-magnetic first substrate 19 by a sputtering method, by forming a non-magnetic film 21 made of $SiO_2$, on the magnetic film 20 by a sputtering method, by obtaining the laminated core (main core portion) 4 by laminating the magnetic film 20 and non-magnetic film 21 alternately in the same manner and by bonding the laminated core 4 on a non-magnetic second substrate 22 by a sputtering method.

Although a case when the magnetic film 20 made of Fe-Al-Si alloy is formed has been exemplified in the present embodiment, the magnetic film 20 may be formed using another material such as Fe or Co amorphous.

A channel 23 which extends in the vertical direction in FIG. 2 is formed at the bonding section of the I-shaped core 17 and the C-shaped core 18 on the first substrate 19. A reinforcing glass 24 is filled in the channel 23 to reinforce the bonding of the I-shaped core 17 and C-shaped core 18.

As shown in FIG. 2, lamination width of the laminated core 4 is set to be thicker than a track width B.

The inclined surface 25 of laminated core 4 is formed before the laminated core 4 is bonded to the slider side 16.

The inclined surface 25 is created at the corner of the magnetic head core 7 on the opposite side of the slider bonding surface 16 of rail 13 in the first embodiment by means of chamfering and grinding. By the way, the inclined surfaces 25 and 25' may be created by means of etching such as ion milling instead of the chamfering and grinding.

A gap created between the inclined surface 25' on the slider bonding surface 16 of the magnetic head core 7 and the rail 3 of the slider 2 may be filled by glass and the like after bonding the magnetic head core 7 to the slider 2.

In this case, the grinding is carried out so that the width B of the upper surface located on the gap 9 side (rail 3 side) of the laminated core 4 becomes equal to a desired track width. Thus the width at the gap 9 of the laminated core 4 is reduced as compared to width at the rear gap 11 by creating the inclined surfaces 25 and 251, so that a magnetic reluctance on the gap 9 side becomes greater than that on the rear gap 11 side. Due to that, the write and readback efficiency may be improved. The reinforcing glass is kept from exposing out to the rail 3 by grinding in such manner.

Because the reinforcing glass 24 is kept in a state not exposing out to the rail 3, no such problems that CSS characteristic and reliability are deteriorated which are otherwise caused when the reinforcing glass exposed out to the rail 3 side are caused.

Because the main core portion 4 is shorter than the side portion 13 of the slider 2, an influence of external disturbing magnetic field may be minimized, allowing to prevent from picking up external noise and to maintain S/N ratio in a good value.

Further, because the reinforcing glass 24 is filled into the notch or the channel 23 formed on the first substrate 19 of the I-shaped core 17, the bonding strength of the I-shaped core 17 and C-shaped core 18 may be enhanced.

Furthermore, because the width B of the upper surface located on the gap 9 side (rail 3 side) of the laminated core 4 is ground so that it becomes equal to a desired track width, the desired track width may be obtained even if a track dislocation is caused in a process for creating the gap 9.

The same operations and effects with those of the floating magnetic head 1 in the first embodiment may be achieved by the floating magnetic head 1 of the second embodiment, as follows.

That is, no such problem that the CSS characteristic and reliability are deteriorated which might be otherwise caused by the reinforcing glass 24 exposing out to the rail 3 side, is caused. Because the magnetic head core 7 is shorter than the side portion 13 of the slider 2, an influence of external disturbing magnetic field is minimized, thereby allowing to prevent from picking-up external noise and to maintain S/N ratio in a good value.

Because the reinforcing glass 24 is filled into the channel 23 formed on the first substrate 19 of the I-shaped core 17, the bonding strength of the I-shaped core 17 and C-shaped core 18 may be enhanced.

As described above, according to the present invention, the following effects may be obtained. Because the magnetic head core is shorter than the side portion of the slider, an influence of external disturbing magnetic field is minimized, allowing prevention of picking up of external noise thus maintaining a good S/N ratio. Because the length of the laminated core is short, the CSS characteristic may be prevented from deteriorating which might be otherwise caused due to a partial abrasion between the magnetic films and the slider. Because the slider and the magnetic head core are fabricated in separate processes, one having a better compatibility with the magnetic films may be used for the non-magnetic substrate of the magnetic head core. Because two cores may be bonded via glass by filling glass into a channel created at the bonding section of at least one non-magnetic substrate of one core with another core and the glass may be prevented from being exposed to the floating surface, the bonding strength may be enhanced without deteriorating the CSS resistance and reliability.

Further, because the inclined surfaces are created from both sides of the magnetic head core so that the width of the laminated core on the gap side becomes equal to a desired track width, the desired track width may be obtained even if a track dislocation is caused in the process of creating the gap of the magnetic head core. Because the thickness of the laminated core at the rear gap side may be set to be larger than that at the gap side, a magnetic reluctance at the gap side becomes significantly greater than that at the rear gap side, thereby improving the write and readback efficiency.

In addition to the effects above, according to the present invention, the following effects may be obtained.

In the prior art composite type, a magnetic head core is inserted into a narrow slit in the slider and bonded via glass. To improve the fluidity of the glass, it is necessary to melt it at a high temperature and to cause it flow into the slit. This means that the high-temperature glass erodes the head core. Especially, those portions of the core which are located on the side of the entrance of the slit are exposed to a large amount of glass. According to the present invention however, because the magnetic head core is bonded to the side portion of the slider using a low melting point glass by a sputtering method, no such problem as described above that the high-temperature glass erodes the head core is caused.

Further, since the track width can be machined in the final step, commercial products having different track widths can be manufactured as one lot until the step for machining the track widths is carried out.

In the novel floating magnetic head, the material which bonds together the magnetic head core and the slider is very thin and hence is hardly exposed to the air bearing surface. Consequently, a step due to glass erosion on lapping is not produced. Also, the material is hardly exposed. Hence, the reliability is high. For the same reason, an aqueous detergent can be used.

Since the amount of the glass used to mount the magnetic head core and the slider is very small, the magnetic head is hardly affected by the bond distortion. Therefore, the write and readback efficiency does not deteriorate. In addition, since bonding can be carried out at lower temperature, a head core having low heat-durability can be used.

The height of the throat is not measured via the sealing glass, unlike the prior art composite-type floating magnetic head. The height of the throat can be readily machined accurately. Also, the measurement can be performed accurately.

In the example, since coils can be wound on both legs of the magnetic head core, the effect of external disturbing magnetic field can be reduced by creating a balanced winding from the coils.

In the novel floating magnetic head, the magnetic head core is mounted on the outside of the slider. This makes it possible to use the outermost portion of the magnetic disk.

Also, a thin-film coil can be used easily instead of ordinary winding.

Further, since the magnetic head core is not exposing out to ABS, a shape of the ABS may be freely changed.

What is claimed is:

1. A floating magnetic head, comprising:

a nearly rectangular non-magnetic slider having a floating surface for generating a floating force against a magnetic recording medium; and a magnetic head core comprising a trailing portion and a leading portion which are thin films made of a magnetic material laminated into a width equivalent to a track width of the floating magnetic head, the trailing portion and leading portion being sandwiched by non-magnetic substrates:

said magnetic head core being bonded via glass to a side portion of said slider, said magnetic head core including a magnetic gap located on a sliding surface of said magnetic head core which slides against said magnetic recording medium;

said magnetic head core having a length shorter than a length of the side portion of said slider and being adhered to the side portion so that said magnetic head core does not extend beyond end portions of said slider; and one of said non-magnetic substrates being adjacent said slider and having a chamfered portion located at said sliding surface so that the glass is not exposed to the sliding surface.

2. A floating magnetic head according to claim 1, the width of said thin films on said sliding surface being equalized to the track width by said thin films, said thin films having a laminated thickness which is thicker than the track width, and by a chamfered portion formed in at least one side of said magnetic head core to create an inclined surface.

3. A floating magnetic head according to claim 1, further comprising coils wound on a plurality of legs formed in the magnetic head core, the coils being located on the trailing side and the leading side of the head core in a balancing manner.

4. A floating magnetic head, comprising:

a nearly rectangular non-magnetic slider having a floating surface for generating a floating force against a magnetic recording medium; and a magnetic head core comprising a trailing portion and a leading portion which are thin films made of a magnetic material laminated into a width equivalent to a track width of the floating magnetic head, the trailing portion and the leading portion being sandwiched by non-magnetic substrates;

said magnetic head core being bonded via glass to a side portion of said slider, said magnetic head core including a magnetic gap located on a sliding surface of said magnetic head core which slides against said magnetic recording medium;

said magnetic head core being made shorter than a length of the side portion of said slider, the width of said thin films on said sliding surface being equalized to the track width by said thin films, said thin films having a laminated thickness which is thicker than the track width, and by a chamfered portion formed in at least one side of said magnetic head core to create an inclined surface; and one of said non-magnetic substrates being adjacent said slider and having a chamfered portion located at said sliding surface so that the glass is not exposed to the sliding surface.

5. The floating magnetic head according to claim 4, further comprising coils wound on a plurality of legs formed in the magnetic head core, the coils being located on the trailing side and the leading side of the head core in a balancing manner.

* * * * *